United States Patent
Hamilton et al.

(10) Patent No.: US 9,926,017 B1
(45) Date of Patent: Mar. 27, 2018

(54) STRUCTURAL ENHANCEMENTS OF AN ELECTRIC VEHICLE

(71) Applicant: GM Global Technology Operations LLC, Detroit, MI (US)

(72) Inventors: David P. Hamilton, Clarkston, MI (US); Raviraj U. Nayak, Troy, MI (US); Giles D. Bryer, Northville, MI (US); Frank Haubold, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/413,829

(22) Filed: Jan. 24, 2017

(51) Int. Cl.
| | | |
|---|---|---|
| *B62D 27/02* | (2006.01) | |
| *B60K 1/04* | (2006.01) | |
| *B62D 21/09* | (2006.01) | |
| *B62D 21/02* | (2006.01) | |

(52) U.S. Cl.
CPC ............... *B62D 27/02* (2013.01); *B60K 1/04* (2013.01); *B62D 21/02* (2013.01); *B62D 21/09* (2013.01); *B60K 2001/0438* (2013.01)

(58) Field of Classification Search
CPC ........ B62D 27/02; B62D 27/06; B62D 27/03; B62D 27/09; B62D 24/02; B62D 24/09; B60K 1/04; B60K 1/0405; B60K 1/0433; B60K 1/0438; B60K 2001/0438
USPC ......................................................... 180/68.5
See application file for complete search history.

(56) References Cited

U.S. PATENT DOCUMENTS

| | | | |
|---|---|---|---|
| 8,226,320 B2 * | 7/2012 | Steinke ..................... | B64C 1/06 403/371 |
| 9,027,684 B2 * | 5/2015 | Araki ....................... | B60K 1/04 180/311 |
| 9,227,582 B2 * | 1/2016 | Katayama ................ | B60K 1/04 |
| 9,281,505 B2 * | 3/2016 | Hihara ..................... | B60K 1/04 |

* cited by examiner

*Primary Examiner* — John D Walters
(74) *Attorney, Agent, or Firm* — Cantor Colburn LLP

(57) ABSTRACT

An electric vehicle includes a chassis frame, a battery pack, and a multi-shear fastener. The battery pack includes a support structure vertically spaced, at least in-part, from the chassis frame. The multi-shear fastener is constructed and arranged to attach the chassis frame to the support structure.

13 Claims, 9 Drawing Sheets

US 9,926,017 B1

STRUCTURAL ENHANCEMENTS OF AN ELECTRIC VEHICLE

INTRODUCTION

The subject invention relates to electric vehicles, and more particularly, to structural enhancements of the electric vehicle.

Vehicles typically include chassis frames designed to support a multitude of vehicle components and contribute toward vehicle stiffness and performance. Examples of frame configurations may include ladder frames, unibody (i.e., semi-monocoque) frames, perimeter frames, and others. Many frames include opposite side rails or rocker panels connected via a multitude of cross members. Projecting forward from the rocker panels may be respective front rails connected via a front cross member, and projecting rearward from the rocker panels may be respective rear rails connected via a rear cross member.

An engine and front suspension may generally be supported by the front rails and proximate cross members. A fuel tank and rear suspension may generally be supported by the rear rails and proximate cross members. The rocker panels and associated cross members may generally support a floor pan, passenger seats, body pillars, and a host of other components and features.

More current vehicles may include hybrid vehicles powered via a combination of batteries and a combustion engine. Yet further, all-electric vehicles, or battery electric vehicles (BEV), may operate solely on a battery pack. Such vehicles typically support the weight of the batteries upon the chassis frame and in a variety of locations having sufficient storage space. In order to maintain desired road clearances the batteries are typically located above the chassis frame. Yet further, the batteries in a single vehicle may require a variety of shapes and sizes in order to utilize available storage space.

Accordingly, improvements in battery storage for BEV's and associated structural frames necessary to support the battery weight while maintaining and/or meeting other, more traditional, structural requirements is desirable while reducing system costs, simplifying complexity of design and maintenance processes, and improving robustness.

SUMMARY

In one exemplary embodiment of the present disclosure, an electric vehicle includes a chassis frame, a battery pack, and a multi-shear fastener. The battery pack includes a support structure vertically spaced, at least in-part, from the chassis frame. The multi-shear fastener is constructed and arranged to attach the chassis frame to the support structure.

In another embodiment, a multi-shear fastener is constructed and arranged to engage a battery pack support structure to a chassis frame of a vehicle. The multi-shear fastener includes a sleeve, a shank, a first head, and a second head. The sleeve includes opposite first and second end portions. The shank extends through the sleeve and along a centerline. The first head is engaged to the shank and is disposed axially outward from the first end portion. The second head is engaged to the shank, is axially spaced from the first head, and is disposed axially outward from the second end portion.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
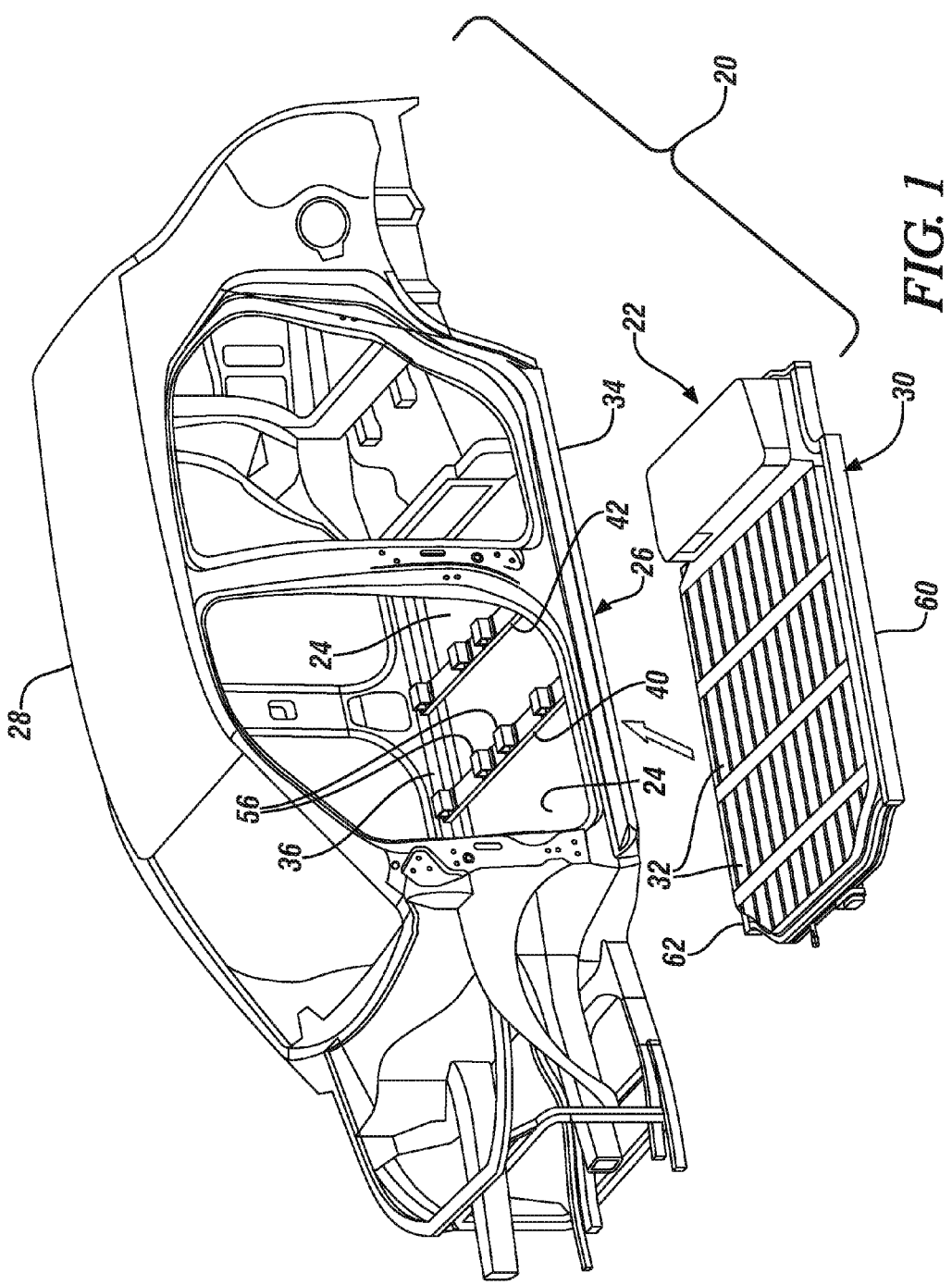
FIG. 1 is a partially disassembled perspective view of an electric vehicle with portions removed to show internal detail, and as one, non-limiting, example in accordance with the present disclosure.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 illustrates a vehicle 20 that may be a hybrid vehicle or a battery electric vehicle (BEV). The vehicle 20 may include an electric storage unit or battery pack 22, a floor pan 24, and a chassis frame 26 that may support, and may generally be unified to, at least a portion of a vehicle body 28. The floor pan 24 may be disposed below and mounted or engaged to the chassis frame 26. The battery pack 22 may include a support structure 30 and a plurality of electric storage modules 32. The support structure 30 may be, at least in-part disposed beneath the floor pan 24 and is engaged to the chassis frame 26. For simplification of design and maintenance, and for reduction in cost, each module 32 may be about the same size, or may be identical.

Figure 2:
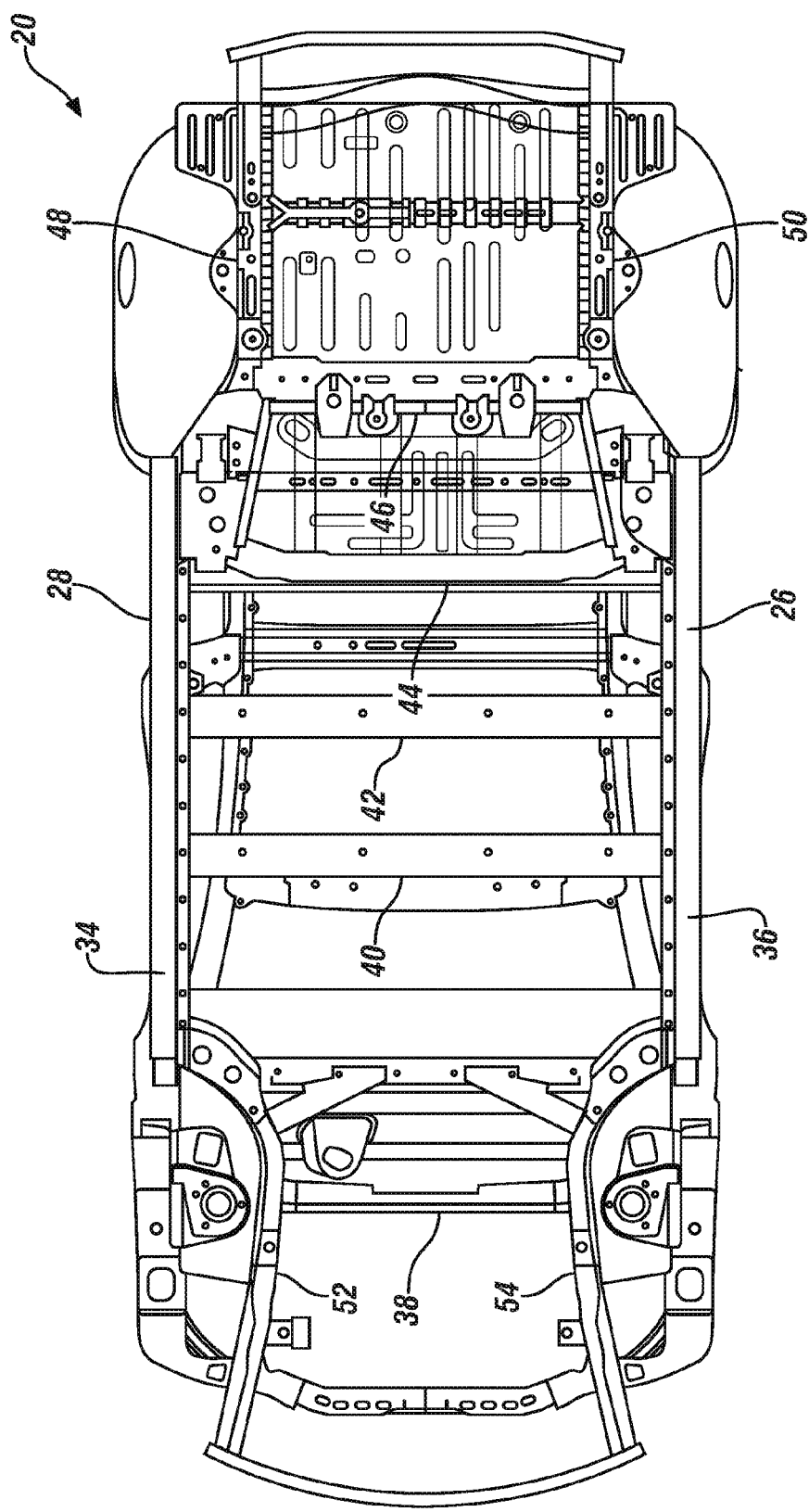
FIG. 2 is a bottom view of the electric vehicle off of FIG. 1 with a floor pan and a battery pack removed to show internal detail.

Referring to FIG. 2, a bottom view of the chassis frame 26 is illustrated with the battery pack 22 removed to show detail. The chassis frame 26 may include two opposite side rails 34, 36 (e.g., rocker panels), a plurality of elongated cross members (i.e., five illustrated as 38, 40, 42, 44, 46) laterally spaced apart from one-another, rearward side rails 48, 50, and forward side rails 52, 54. In one example, the cross member 38 spans between and is engaged to the forward side rails 52, 54, and the cross member 46 spans between and is engaged to the rearward side rails 48, 50. The cross members 40, 42, 44 may be seat support cross members, and may span between and are engaged to the side rails 34, 36. The chassis frame 26 may further include a plurality of seat mounts 56 projecting upward from, and engaged to, at least the cross members 40, 42 (see FIG. 1) for engagement and support of passenger seats (not shown).

Figure 3:
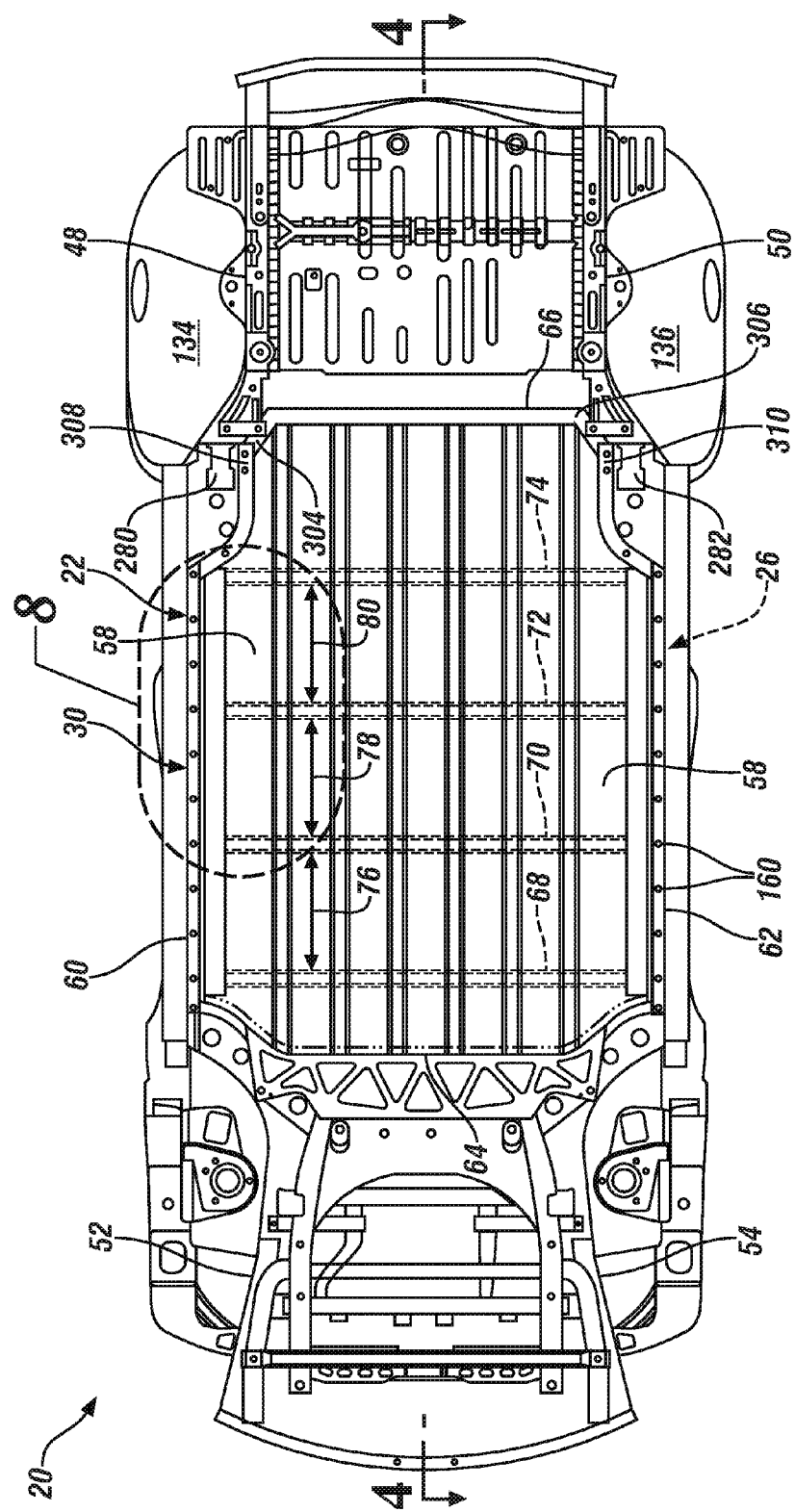
FIG. 3 is a bottom view of the electric vehicle of FIG. 1 with a battery pack installed.
Figure 4:
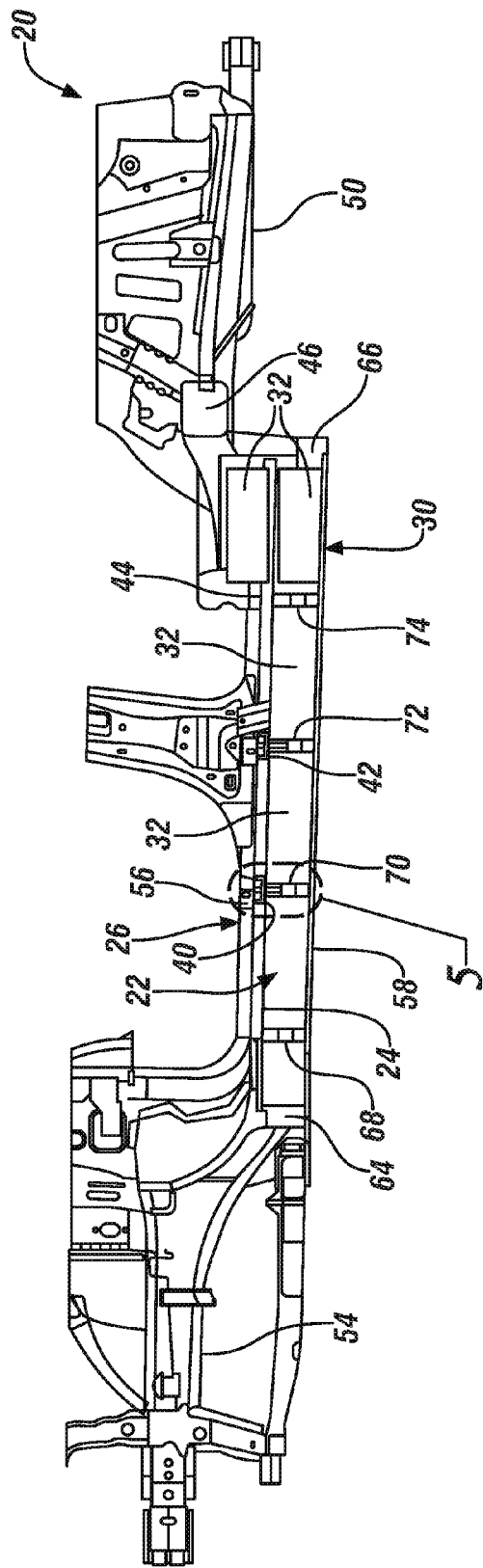
FIG. 4 is partial cross section of the electric vehicle of FIG. 1 viewing in the direction of arrows 4-4 in FIG. 3.

Referring to FIG. 3 a bottom view of the vehicle 20 is illustrated with the battery pack 22 installed thus substantially eliminating, or masking-off, substantial views of the chassis frame 26 illustrated in FIG. 2. As best shown in FIG. 4, however, an upright cross section of the vehicle 20, taken along lines 4-4 of FIG. 3, is illustrated and depicts the chassis frame 26 and the battery pack 22 generally disposed beneath the chassis frame. The battery pack 22 may include a bottom pan 58 that may be adapted to protect the electric storage modules 32 generally from the road surface, may be corrugated, and may at least partially support the modules. The bottom pan 58 may be engaged to, and disposed generally beneath, the support structure 30 of the battery pack 22. The support structure 30 may include opposite side components 60, 62 (see FIGS. 1 and 3), a forward cross component 64, a rearward cross component 66, and a plurality of elongated cross components (i.e., four illustrated as 68, 70, 72, 74) laterally spaced apart from one-another. In FIG. 3, the components 60, 62, 68, 70, 72, 74 are shown in ghost (i.e., dotted lines) because the components are located on the other side of the bottom pan 58 in the illustrated example. In one embodiment, the forward cross component 64 spans between and is engaged to the forward end portions of the side components 60, 62, and the rearward cross component 66 spans between and is engaged to rearward end portion of the side components 60, 62. The cross components 68, 70, 72, 74 are laterally spaced from one-another and may each span between and are engaged to the side components 60, 62.

A distance (see arrow 76 in FIG. 3) that is measured in a forward-to-aft direction between the cross components 68, 70 may be about equivalent to a distance (see arrow 78) measured between the cross components 70, 72. Similarly, the distance 78 may be substantially equivalent to a distance (see arrow 80) measured between the cross components 72, 74. In one example, each electric storage module 32 may be sized to closely fit between the cross components 68, 70, 72, 74 to achieve optimal packaging. Because the distances 76, 78, 80 are substantially equivalent, each module 32 may be generally equivalent (i.e., at least in size) to facilitate a reduction in manufacturing and maintenance costs through module redundancy.

Figure 5:
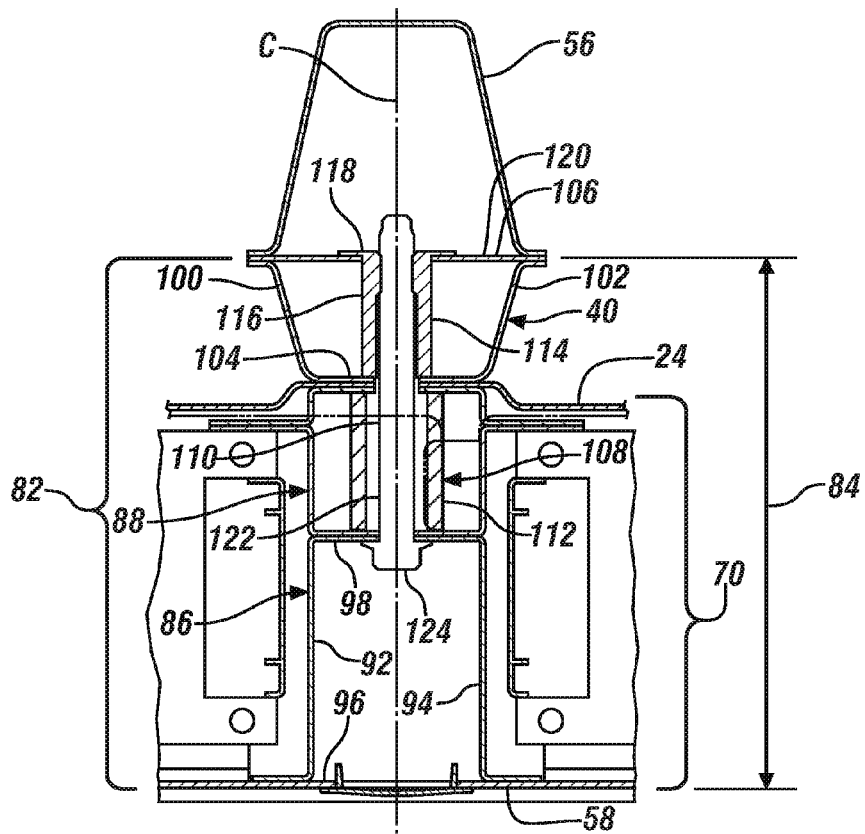
FIG. 5 is an enlarged cross section of a compound cross beam of the electric vehicle taken from circle 5 of FIG. 4.

Compound Cross Beam:

Referring to FIG. 5, the cross member 40 of the chassis frame 26 and the cross component 70 of the support structure 30 is illustrated; however, it is understood that the same principles to be described may apply to the remaining cross members and cross components not specifically illustrated. Together, the cross member 40 and the cross component 70 form a compound cross beam 82 (i.e., integrated cross beam) having substantially greater strength than the cross member and cross component take individually. That is and in general, the cross beam 82 strength (i.e., bending moment inertia), taken in a substantially vertical direction, is proportional to:

$$(bh^3)/12 \tag{1}$$

where "b" is a constant and "h" is an overall height (see arrow 84 in FIG. 5). This increase in vertical strength facilitates greater design and energy storage module 32 packaging capability while maintaining desired road clearances and passenger spaciousness within the vehicle 20.

The cross component 70 may include a lower portion 86 that may be tubular, and an upper portion 88 that may generally be a spacer portion. The lower portion 86 may be engaged to and projects upward from the battery pan 58. The upper portion 88 spans vertically between and is engaged to the lower portion 86 and the cross member 40. In one embodiment, the floor pan 24 may be sandwiched between the upper portion 88 of the cross component 70 and the cross rail 40. As best shown in FIG. 5, the lower portion 86 may be tubular in shape having opposite side walls 92, 94, a bottom wall 96 and a top wall 98. Similarly, the cross member 40 may be tubular in shape having opposite side walls 100, 102, a bottom wall 104, and a top wall 106. When assembled, the top wall 106 may be engaged to the seat mount 56; and, the floor pan 24 may be disposed, in-part, between, and may be in contact with, the bottom wall 104 of the cross member 40 and the upper portion 88 of the cross component 70. It is further contemplated and understood that the cross member 40, the lower portion 86, and the upper portion 88 may alternatively be any variety of cross sectional shapes that provide the desired height with the desired structural integrity. One alternative example of such a structure may be a U-channel. Moreover, the entire part or various segments of the cross member 40, the lower portion 86, and/or the upper portion 88 may be formed as one unitary piece (e.g., cold rolled from a sheet of steel) and/or segments may be adhered or attached individually by other means.

The compound cross beam 82 may further include a plurality of fasteners 108 distributed along the beam for connecting the cross component 70 to the cross member 40. As best shown in FIG. 5, each fastener 108 may be of a double shear design, and may include a bolt 110, a lower sleeve 112, and an upper sleeve 114. When the compound cross beam 82 is assembled, the bolt 110 is generally inverted and may extend along a substantially vertical centerline C. The lower sleeve 112 may be generally disposed within, and is axially aligned to, the upper portion 88 and may bear vertically at one end upon the top wall 98 of the lower portion 86, and bear vertically at an opposite end upon the bottom wall 104 of the cross member 40.

The upper sleeve 114 may include a tubular segment 116 and a flanged segment 118. When assembled, the tubular segment 116 may be substantially disposed within the cross member 40, and may be centered to centerline C. A bottom portion of the tubular segment 116 may bear down upon the bottom wall 104 of the cross member 40, and a top portion of the tubular segment may project through the top wall 106 of the cross member 40. The flange or flanged segment 118 generally projects radially outward from the top portion of the tubular segment 116 and bears down upon an upward facing surface 120 of the top wall 106. At least a portion of the tubular segment 116 may carry female threads for threaded engagement to the male threads carried by a threaded shaft 122 of the bolt 110. The bolt 110 further includes an enlarged head 124 disposed in the bottom portion 86 of the cross component 70 and bears upward against the top wall 98. It is contemplated and understood that the fastener 108 may be inverted from that described above with the enlarged head bearing down upon the top wall 106 of the cross member 40 and the flange 118 bearing upward against the top wall 98 of the bottom portion 86. It is further contemplated and understood that the flanged segment 118, or portions thereof, may be replaced with a threaded nut.

Advantages and benefits of the present disclosure include a compound cross beam that may provide a reduction in vibration, improvements in seat belt anchor strength, and an increase in seat stiffness. Other advantages may include weight reduction, improved packaging efficiency and a flexible design strategy.

Figure 6:
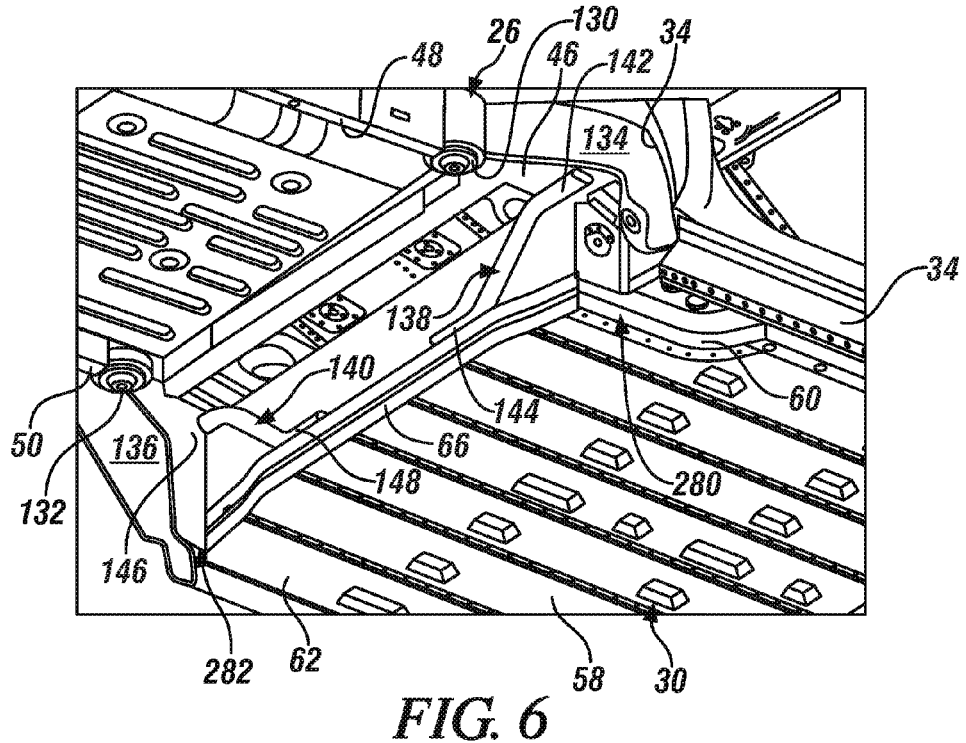
FIG. 6 is a partial perspective bottom view of the electric vehicle with portion removed to show internal detail.

Truss Beam:

Referring to FIGS. 1, 2 and 6, the chassis frame 26 may further include suspension mounts 130, 132 (e.g., coiled spring seats) for coupling to a vehicle suspension system as is known to one having skill in the art. In the present disclosure, the suspension mounts 130, 132 may be attached or carried by forward sections of respective rearward side rails 48, 50 of the chassis frame 26 located adjacent to, and generally inward from, rear wheel wells 134, 136 of the vehicle 20. The rearward cross member 46 may attach to the rearward side rails 48, 50 immediately forward of the respective suspension mounts 130, 132. It is further contemplated and understood that the suspension mounts 130, 132 may be any type of connection point where loads are transferred between the chassis frame 26 and the vehicle suspension system including shock absorber connection points.

Figure 7:
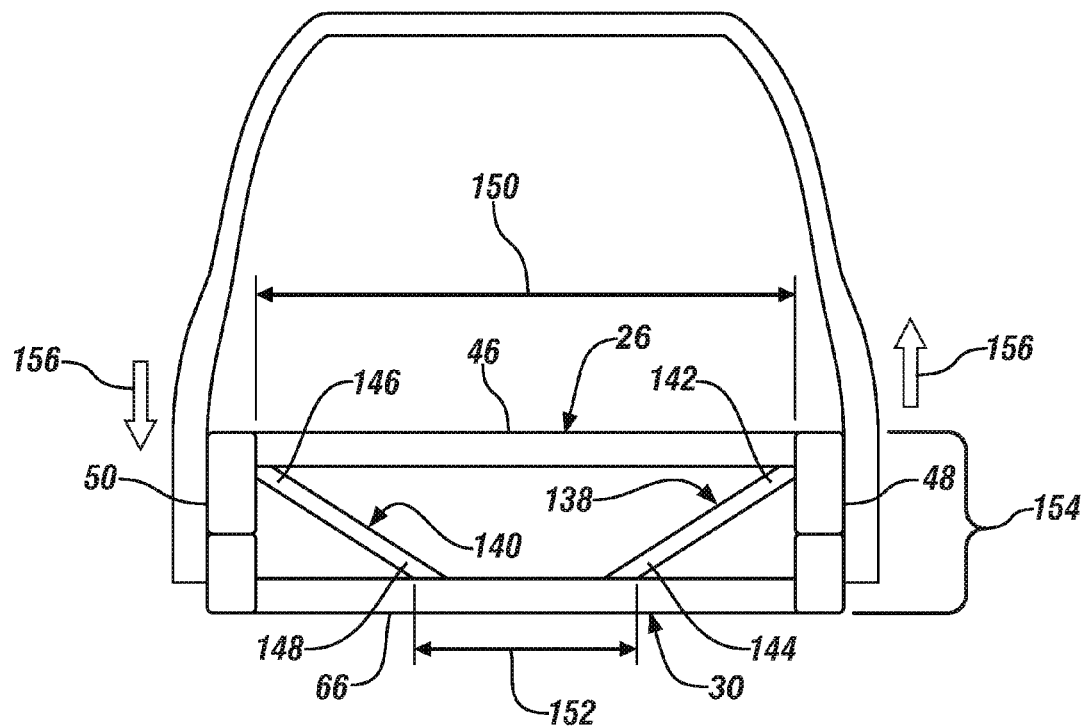
FIG. 7 is a schematic view depicting a truss beam of the electric vehicle.

Referring to FIGS. 4, 6, and 7, cross member 46 of the chassis frame 26 may be spaced rearward from, and spaced above, the adjacent cross member 44 (see FIG. 4). The cross member 44 may be generally combined with cross component 74 of the battery support structure 30 to become a compound cross beam as previously described. In contrast, the pairing of the cross member 46 with the rearward cross component 66 may not form a compound cross beam, and instead, may both be part of a truss beam 154 (see FIG. 7).

Like the cross member 44 being located about the cross component 74, the cross member 46 may be located above the rearward cross component 66. But unlike the cross member 44, the cross member 46 may be appreciably spaced above the rearward cross component 66. Moreover and in further contrast to the relationship of the cross member 44 to the cross component 74, the cross member 46 may be positioned slightly rearward of the rearward cross component 66.

Referring to FIGS. 6 and 7, the truss beam 154 may further include first and second braces 138, 140 that may be elongated and oppositely angled. The first brace includes opposite end portions 142, 144 and the second brace includes opposite end portions 146, 148. Each brace 138, 140 generally spans between the cross member 46 and the rearward cross component 66 at an angle (i.e., not completely vertical and not completely horizontal). More specifically, the upper end portions 142, 146 of the respective first and second braces 138, 140 may be engaged to the respective rearward side rails 48, 50 (i.e., immediately forward of, and/or proximate too, the suspension mounts 130, 132), and the lower end portions 144, 148 may be engaged to the rearward cross component 66.

When assembled, a first distance (see arrow 150 in FIG. 7), measured between the first end portions 142, 146, may be substantially equivalent to a distance measured between the rearward side rails 48, 50 of the chassis frame 26, and substantially greater than a distance (see arrow 152) measured between the second end portions 144, 148. In one embodiment, distance 152 may be about thirty percent (30%) of distance 150.

When the vehicle 20 is assembled, the rearward cross member 46 of the chassis frame 26 with the attached braces 138, 140, and the associated rearward cross component 66 of the battery support structure 30, may form the truss beam 154 (see FIG. 7). The truss beam 154 is constructed and arranged to provide an overall stiffer framework for the vehicle 20 in torsion (see arrows 156 denoting torsional forces). It is further contemplated and understood that various structural alterations of the truss beam 154, the chassis frame 26, and the battery support structure 30 may be made without departing from the general structure and functionality of the truss beam 154. For example, connection points of the braces 138, 140 may vary. In one example, the upper end portions 142, 146 may engage end portions of the cross member 46, which are proximate to the respective rearward side rails 48, 50.

Advantages and benefits include a truss beam that improves the combined strength of the chassis frame and the battery pack support structure. Other advantages include an integrated structure with a greater effective height in a more traditional rearward cross member, that proximate to suspension mounts facilitates an efficient structure load path. Further benefits include a reduction in vibration, improved stiffness that resists torsional forces, weight reduction, improved packaging efficiency and a flexible design strategy.

Figure 8:
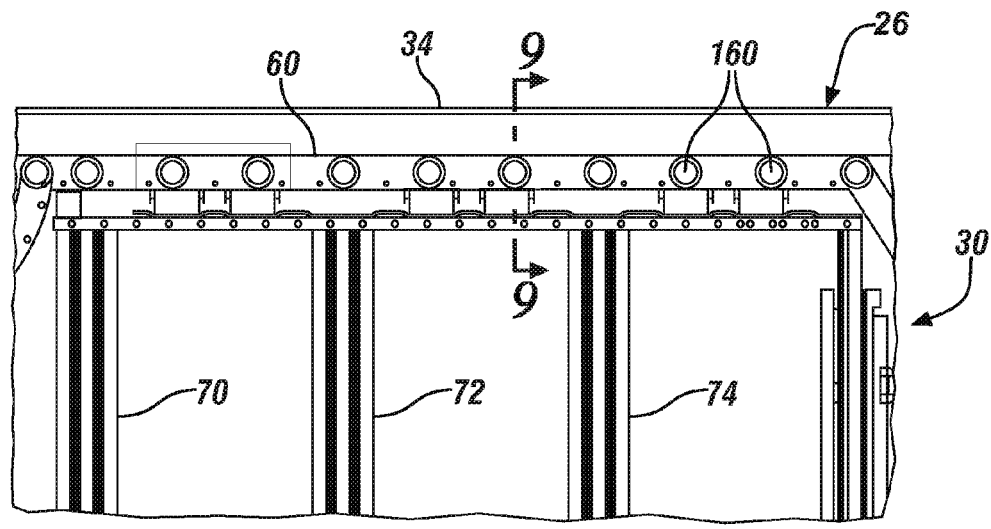
FIG. 8 is a partial bottom view depicting a battery pack support structure of the battery pack engaged to a chassis frame of the electric vehicle via a plurality of fasteners distributed along a compound side beam, with a bottom pan removed to show detail, and taken from circle 8 of FIG. 3.
Figure 9:
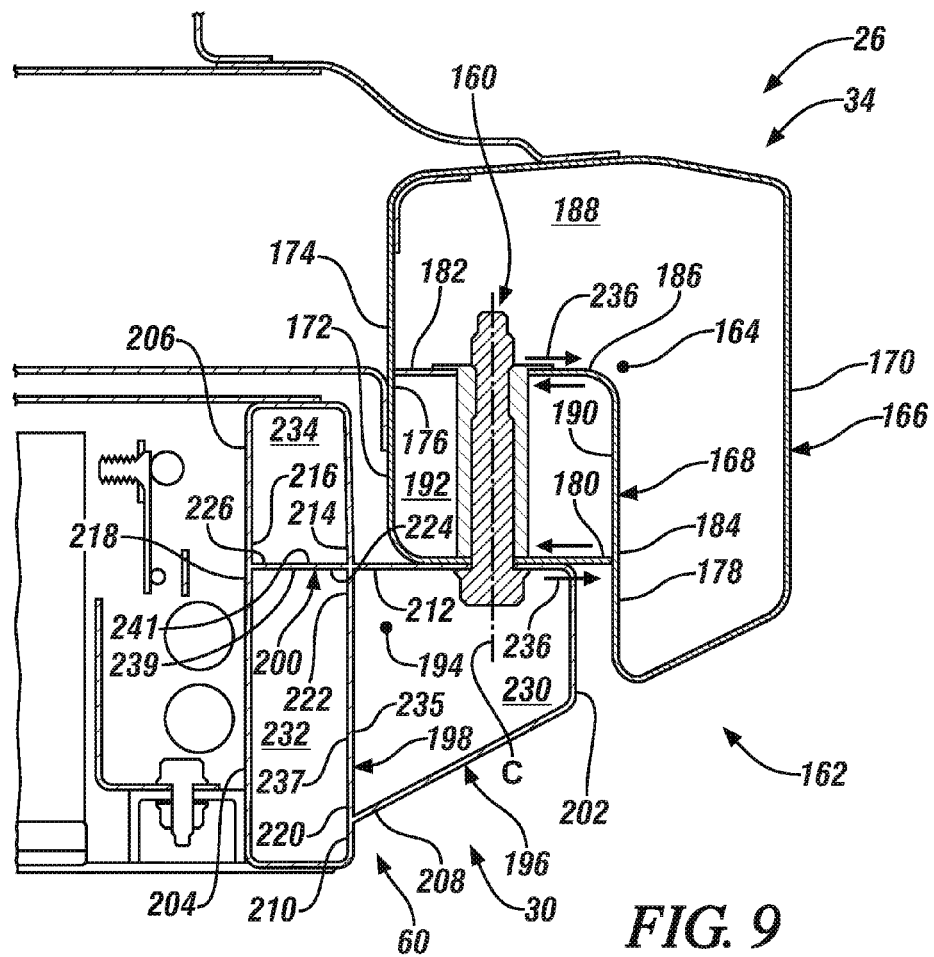
FIG. 9 is a cross section of a compound side beam viewing in the direction of arrows 9-9 in FIG. 8.

Compound Side Beam:

Referring to FIGS. 8 and 9, the side rail 34 of the chassis frame 26 and the side component 60 of the support structure 30 is illustrated; however, the same principles to be described may apply to the opposite side rail 36 and side component 62. The side rail 34 (i.e., rocker panel) of the chassis frame 26 may be connected to the side component 60 of the battery pack support structure 30 via a plurality of fasteners 160. The side component 60 co-axially extends with, and may be 'nested' inboard of the side rail 34 such that a portion of the side component 60 is disposed beneath a portion of the side rail 34. More specifically, the nested orientation between the side component 60 and the side rail 34 may facilitate attachment of the battery pack support structure 30 to the chassis frame 26 from below to improve structural integrity. In the present example, one or both of the side rail 34 and the side component 60 may be multi-celled, and when connected together, form a compound side beam 162.

Referring to FIG. 9, the side rail 34 of the chassis frame 26 may generally extend along a centerline 164, and may include an outer shell 166 that may be circumferentially continuous about the centerline 164, and an inner divider 168 that may be disposed inside the outer shell 166. The divider 168 may have opposite end portions 182, 184 that connect to the outer shell 166. The outer shell 166 may include first and second, circumferentially extending, shell segments 170, 172 (i.e., walls). A first end portion 174 of the first shell segment connects to (i.e., or forms congruently into) a first end portion 176 of the second shell segment 172 that is proximate to the end portion 182 of the inner divider 168. Similarly, an opposite second end portion 178 of the first shell segment 170 may connect to (i.e., or form congruently into) an opposite second end portion 180 of the second shell segment 172 that is proximate to the end portion 184 of the inner divider 168.

With the divider 168 being located inside the outer shell 166, the first end portion 182 of the divider 168 may generally connect to the first end portions 174, 176 of the respective first and second shell segments 170, 172, thereby forming a first three-way connection of end portions 174, 176, 182. Similarly, the second end portion 184 of the divider 168 may generally connect to the second end portions 178, 180 of the respective first and second shell segments 170, 172, thereby forming a second three-way connection of end portion 178, 180, 184. It is contemplated and understood that the first and second three-way connections may be generally formed or secured by flanges of the connecting end portions, or other techniques, known in the art.

When the compound side beam 162 is assembled, the first shell segment 170 of the outer shell 166 may be an outward wall, and the second shell segment 172 may be an inward wall (i.e., adjacent to the side component 60). The first shell segment, or the outward wall, 170 and a first side 186 of the divider 168 may define boundaries of a first cell 188. The second shell segment, or the inward wall, 172 and an opposite second side 190 of the divider 168 may define the boundaries of a second cell 192.

The side component 60 of the battery pack support structure 30 may generally extend along a centerline 194 that may be substantially parallel to the centerline 164. The side component 60 may include an outer shell 196 that may be circumferentially continuous about the centerline 194, a first inner wall or divider 198, and a second inner wall or divider 200, both located inside the outer shell 196. The outer shell 196 may include first, second, and third outer shell segments 202, 204, 206. Each shell segment 202, 204, 206 extends circumferentially with a first end portion 208 of the first shell segment 202 connecting to a first end portion 210 of the second shell segment 204, and an opposite second end portion 212 of the first shell segment 202 connecting to a first end portion 214 of the third shell segment 206. In furtherance, an opposite second end portion 216 of the third shell segment 206 is connected to a second end portion 218 of the second shell segment 204. It is contemplated and understood that the various connections may be congruently formed, may be formed through engagement of end portion flanges, or may be facilitated by any other attachment means known by one skilled in the art.

With the understanding that the first and second inner dividers 198, 200 are located inside the outer shell 196, a first end portion 220 of the first divider 198 may generally connect to the end portions 208, 210 of the respective shell segments 202, 204, thereby forming a three-way connection of end portions 208, 210, 220. A second end portion 222 of the first divider 198 may generally connect to a first end portion 224 of the second divider 200 and may further connect to end portions 212, 214 of the respective first and third shell segments 202, 206, thereby forming a four-way connection of end portions 212, 214, 222, 224. An opposite second end portion 226 of the second divider 200 may generally connect to end portions 216, 218 of the respective third and second shell segments 206, 204, thereby forming a three-way connection of end portions 216, 218, 226. It is contemplated and understood that the various connections may be congruently formed, may be formed through engagement of end portion flanges, or may be facilitated by any other attachment means known by one skilled in the art.

The side component 60 may further include first, second, and third cells 230, 232, 234. Boundaries of the first cell 230 may be defined by the first shell segment 202 of the outer shell 196 and a first side 235 of the first divider 198. Boundaries of the second cell 232 may be defined by the second shell segment 204 of the outer shell 196, an opposite side 237 of the first divider 198, and a first side 239 of the second divider 200. Boundaries of the third cell 234 may be defined by the third shell segment 206 of the outer shell 196 and an opposite side 241 of the second divider 200.

When the compound side beam 162 is assembled, the side component 60 of the battery pack support structure 30 may be 'nested' to the side rail 34 of the chassis frame 26. More specifically: a substantially vertical portion of the third shell segment 206 of the side component 60 may be adjacent to a substantially vertical portion of the second shell segment 172 of the side rail 34; a substantially horizontal portion of the first shell segment 202 of the side component 60 may be in contact with a substantially horizontal portion of the second shell segment 172 of the side rail 34; and, a substantially vertical portion of the first shell segment 202 of the side component 60 may be adjacent to a substantially vertical portion of the first shell segment 170 of the side rail 34. The side components and side rails may be made of cold rolled steel, stamped steel, tubular steel, and/or any other materials and structures including composites.

Figure 10:
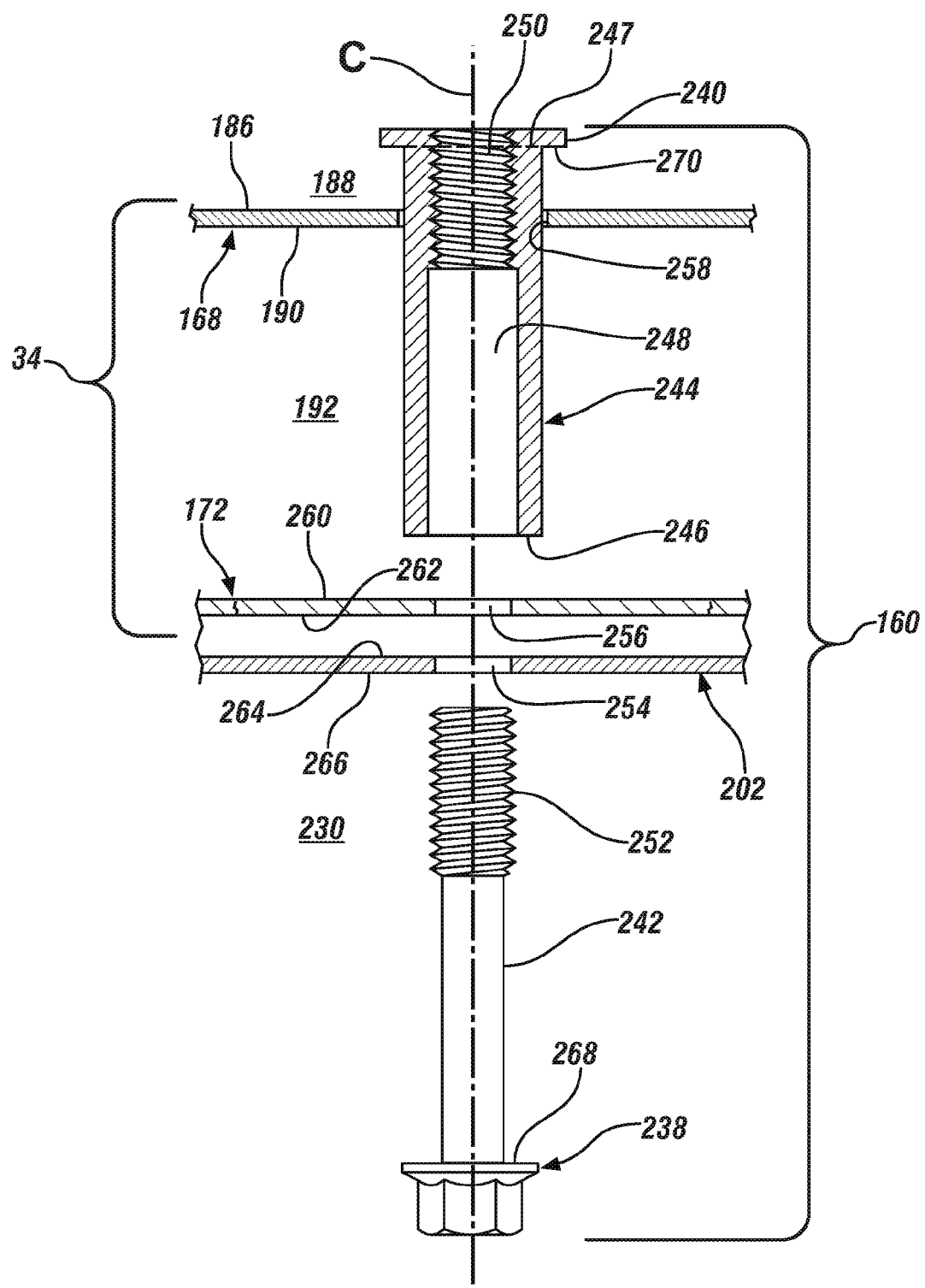
FIG. 10 is a disassembled cross section of the fastener taken from FIG. 9.

Advantages and benefits of the present disclosure include a compound side beam that may offer a reduction in vibration, and an increase in strength and stiffness. Other advantages may include weight reduction, improved packaging efficiency and a flexible design strategy Multi-Shear Fastener:

Referring to FIGS. 8 through 10, the fasteners 160 may be multi-shear fasteners (e.g., double shear fastener, see arrow pairs 236 in FIG. 9). The fasteners 160 may be similar too, or the same as, the fasteners 108 previously described and used to assemble the cross beam 82. In the illustrated example, the fasteners 160 may be used to connect the side rail 34 (i.e., rocker panel) of the chassis frame 26 to the side component 60 of the battery pack support structure 30, and may be spaced or distributed axially along the side component 60 and side rail 34. Each fastener 160 may be generally elongated, and disposed along a substantially vertical centerline C.

Referring to FIG. 10, each fastener 160 may include opposite first and second heads 238, 240, a shank 242 and a sleeve 244. When assembled, the sleeve 244 extends circumferentially about the shank 242 and may include opposite end portions, or end faces 246, 247, that may be annular in shape and face in axially opposite directions. The first head 238 may be engaged to, and projects radially outward from, an end portion of the shank 242. Together, the first head 238 and the shank 242 may be a unitary, one-piece, bolt. The second head 240 may be a flange that projects radially outward from an end portion, or the end face 247, of the sleeve 244, such that the sleeve 244 and the flange 240 may be one, unitary, piece. An inner cylindrical surface 248 of the sleeve 244, and/or the flange 240, may carry female threads 250 for threaded and detachable engagement to male threads 252 carried by the shank 242.

When the compound side beam 162 is assembled, the shank 242 extends axially through openings 254, 256 in respective shell segments 202, 172, through the sleeve 244, and through the second head 240. The sleeve 244 may extend through an opening 258 in the divider 168 of the side rail 34. With the shank 242 threadably engaged and torqued to the sleeve 244, the annular end face 246 of the sleeve 244 may bear upon (i.e., biased against) an upward facing side 260 of the shell segment 172. An opposite side 262 of the shell segment 172 may bear upon an upward facing side 264 of the shell segment 202, and an opposite side 266 of the shell segment 202 may bear upon an upward facing face 268 of the head 238 that may be annular in shape. Additionally, a downward facing face 270 of the head or flange 240, which may be annular in shape, may be biased against the side 186 of the divider 168.

It is further contemplated and understood that in one embodiment, the head 240 may be a threaded nut, and may thread directly to the shank 242. In this example, the sleeve 244 may not extend through the divider 168, and instead, may bear upon the downward facing side 190 of the divider 168. In another example, the head 240 may be adhered, or otherwise fixed, to the side 186 of the divider 168 prior to assembly of the compound side beam 162. In this example, the shank 242 may be torqued without incurring rotation of the head 240 and sleeve 244. In yet another example, the head 238 may be a nut threaded to the shank 242. In all of these examples, the double-shear effect at the divider 168 and the shell segments 172, 202 may be facilitated.

Figure 11:
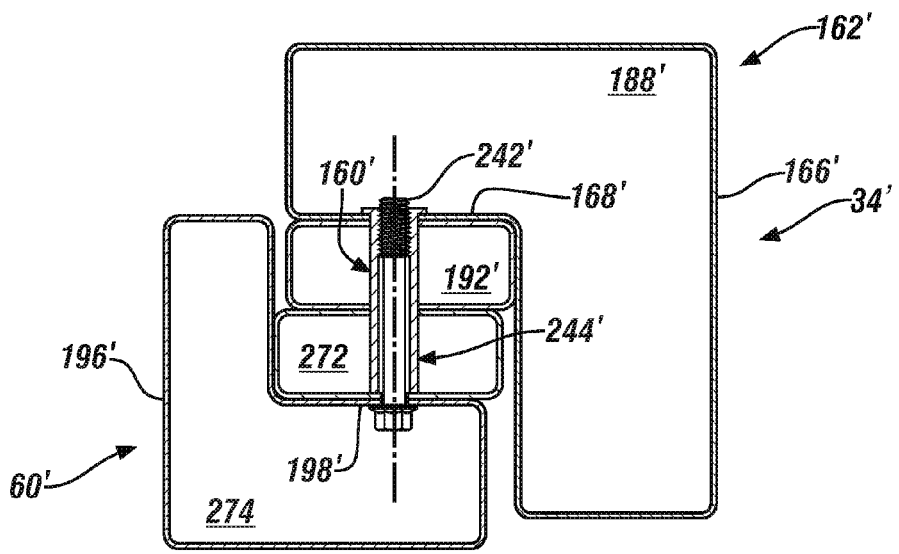
FIG. 11 is a cross section of a third embodiment of a compound side beam.

Referring to FIG. 11, another embodiment of a nested, compound, side beam is illustrated wherein like elements to the first embodiment have like identifying numerals except with the addition of a prime symbol suffix. A compound side beam 162' may include a side rail 34' and a nested side component 60' attached together via a plurality of multi-shear fasteners 160'. The side rail 34' may be cellular, and includes an outer shell 166' and a divider 168' both defining boundaries of cells 188', 192'. Similarly, the side component 60' may be cellular, and includes an outer shell 196' and a divider 198' both defining boundaries of cells 272, 274.

The fastener 160' may be disposed in, and extends through, the cells 192', 272. In one example, the fastener 160' may include at least one sleeve 244' that extends through both cells 192', 272 and is generally attached and/or bears upon the dividers 168', 198'. In another example not illustrated, the sleeve 244' may generally be two separate sleeves generally disposed in respective cells 192', 272. With two separate sleeves, the fastener 160' may include three shear locations with the first shear location proximate to and between the two sleeves, and the other two shear locations proximate to respective ends of a shank 242'.

Advantages and benefits of the present disclosure include the ability to detachably secure a battery pack support structure 30 to a chassis frame 26 such that the battery pack 22 is not simply a parasitic mass, and instead the overall vehicle structural performance is enhanced. Other advantages may include improved vehicle level design targets, which may include reduction in vibration, and improvements in strength and stiffness. Further advantages may include weight reduction, improved packaging efficiency and a flexible design strategy.

Bushing Mount Reinforcement Assembly:

Referring to FIG. 3, the vehicle 20 may include a multitude of bushing mounts (i.e., two illustrated and identified as 280, 282) that may be engaged to the chassis frame 26 as is commonly known to one skilled in the art. In one example, the bushing mounts 280, 282 may be A-bushing suspension mounts located near respective, rear, wheel wells 134, 136 of the vehicle 20. In the present disclosure, the bushing mounts 280, 282 may also be engaged to the battery pack support structure 30, thereby facilitating further reinforcement of the bushing mounts 280, 282, and/or the support structure 30. In one example, the bushing mounts 280, 282 may receive lateral reinforcement from the support structure 30.

Figure 12:
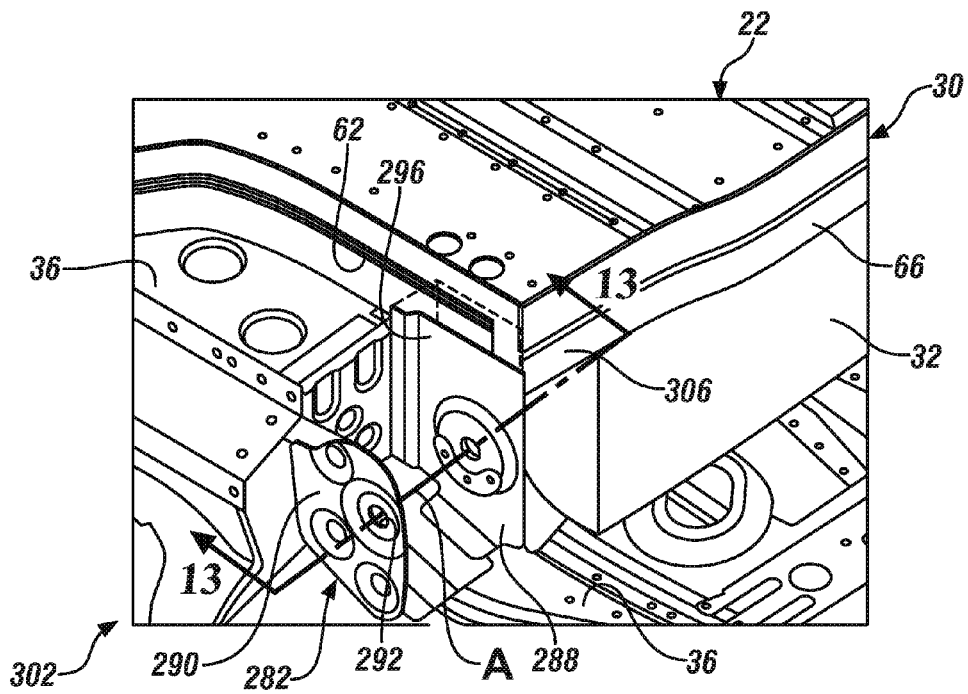
FIG. 12 is a partial perspective bottom view of the vehicle illustrating a bushing mount secured to the batter pack support structure.
Figure 13:
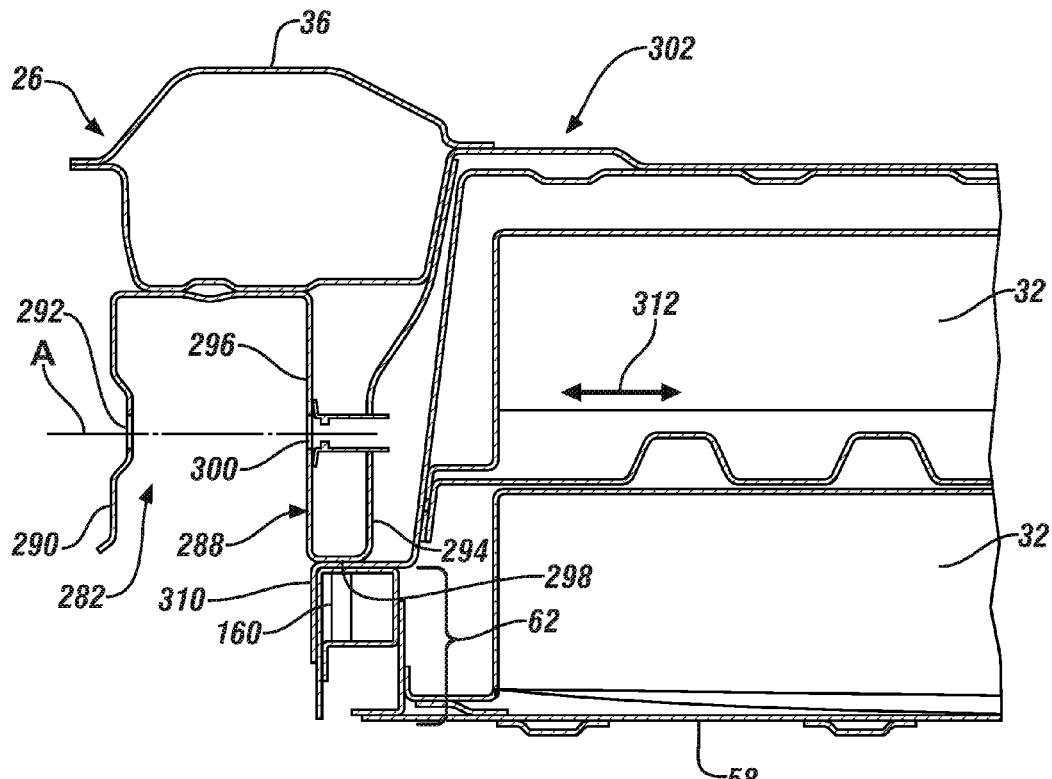
FIG. 13 is a cross section of the vehicle viewing in the direction of arrows 13-13 in FIG. 12.

Referring to FIGS. 12 and 13, the bushing mount 282 is generally illustrated and described; however, it is understood that the same principles may apply to the bushing mount 280. The bushing mount 282 may include first and second ears 288, 290 spaced apart from one-another for receipt of a bushing there-between. The first ear 288 may be an inward ear that is adjacent to, and spaced apart from, an inward ear of the bushing mount 280 (not shown). The second ear 290 may be an outward ear. In one example, each ear 288, 290 may project substantially downward from, and may be engaged to, the side rail 36 of the chassis frame 26. It is contemplated and understood that the ears 288, 290 may be engaged to other structural members of the vehicle 20 with generally different orientations.

The outward ear 290 of bushing mount 282 may be a single wall, stamped from sheet metal material, and may include an opening or thru-passage 292 that facilitates mounting of the bushing. The inward ear 288 may generally be tubular, and/or, may include an inward wall 294, an outward wall 296, and a bottom wall 298 (see FIG. 13). The inward and outward walls 294, 296 may project substantially downward from, and may be engaged to, the side rail 36 of the chassis frame 26. The bottom wall 298 may be substantially horizontal, and may span between, and may be engaged to, lower end portions of the inward and outward walls 294, 296. The inward and outward walls 294, 296 may each include an opening or thru-passage 300 that facilitates mounting of the bushing. In one example, the openings 292, 300 align to a common axis A that may be substantially horizontal and disposed normal to the ears 288, 290. The inward wall 294, the outward wall 296, and the bottom wall 298 may be stamped from a single piece of sheet metal material. It is further contemplated and understood that the entire bushing mount 282 may be stamped from a single sheet metal piece thereby generally forming an S-shaped cross section.

Referring to FIGS. 3, 12 and 13, when the vehicle 20 is assembled, end portions 304, 306 of the rearward cross component 66 of the battery pack support structure 30 (see FIG. 3) may be generally located below and rearward of the respective bushing mounts 280, 282. Rearward end portions 308, 310 of the side components 60, 62 (see FIG. 3) may be located below and engaged to the bottom walls 298 (see FIG. 13) of the inward ears 288 of the respective bushing mounts 280, 282. Engagement of the side components 60, 62 to the respective inward ears 288 may be facilitated by respective multi-shear fasteners 160, previously described. Together, the bushing mounts 280, 282, the side components 60, 62, the rearward cross component 66 and the fasteners 160 may generally form a bushing mount reinforcement assembly 302 (also see FIG. 12).

In operation, engagement of the side components 60, 62 of the battery pack support structure 30 to the inward ears 286, 288 of the respective bushing mounts 280, 282 improves lateral strength of the mounts by reducing flex of the inward ears 288 and providing greater stiffness in a lateral direction (see arrow 312 in FIG. 13) with respect to the vehicle 20. That is, greater stiffness in a direction that extends between opposite sides of the vehicle 20. Yet further, the bushing mounts 280, 282 may assist in providing vertical support for the support structure 30. It is further contemplated and understood that other structural orientations between the bushing mounts 280, 282 and the support structure 30 may be adopted. For example, end portions 304, 306 of the rearward cross component 66 may be engaged directly to the inward ears 188 of the respective bushing mounts 280, 282.

Advantages and benefits of the present disclosure include the ability to detachably secure a battery pack support structure 30 to bushing mounts 280, 282, such that the battery pack 22 is not simply a parasitic mass, and instead the overall vehicle structure performance is enhanced. Other advantages may include improved vehicle level design targets, which may include reduction in vibration, and improvements in strength and stiffness. Further advantages may include weight reduction, improved packaging efficiency and a flexible design strategy.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An electric vehicle comprising:
   a chassis frame;
   a battery pack including a support structure vertically spaced at least in-part from the chassis frame; and
   a multi-shear fastener constructed and arranged to attach the chassis frame to the support structure, wherein the multi-shear fastener attaches a side rail of the chassis frame to a side component of the support structure, and the side component is nested into the side rail.

2. The electric vehicle set forth in claim 1, wherein the side rail is multi-cellular.

3. The electric vehicle set forth in claim 2, wherein the side component is multi-cellular.

4. An electric vehicle comprising:
   a chassis frame;
   a battery pack including a support structure vertically spaced at least in-part from the chassis frame; and
   a multi-shear fastener constructed and arranged to attach the chassis frame to the support structure, wherein the multi-shear fastener includes a sleeve, a shank extending through the sleeve and along a centerline, a first head engaged to the shank, and a second head engaged to the shank and axially spaced from the first head, and wherein the first head bears at least upon the support structure and a first end face of the sleeve, and the second head bears at least upon the chassis frame and an opposite second end face of the sleeve.

5. The electric vehicle set forth in claim 4, wherein the second head is a flange projecting radially outward from the sleeve.

6. The electric vehicle set forth in claim 5, wherein the first head is a bolt head and the shank is threadably engaged to the sleeve.

7. The electric vehicle set forth in claim 6, wherein the chassis frame is tubular and the sleeve is disposed within the chassis frame.

8. The electric vehicle set forth in claim 7, wherein the chassis frame includes an outer shell and a divider having opposite first and second sides, and wherein the outer shell and the first side define a first cell and the outer shell and the second side define a second cell, and the sleeve is disposed in the first cell.

9. The electric vehicle set forth in claim 8, wherein the flange is in the second cell and bears upon the divider.

10. The electric vehicle set forth in claim 9, wherein a portion of an outer shell of the support structure is in contact with a portion of the outer shell of the chassis frame, and the portions are disposed between the bolt head and the first end face.

11. A multi-shear fastener constructed and arranged to engage a battery pack support structure to a chassis frame of a vehicle, the multi-shear fastener comprising:
    a sleeve including opposite first and second end portions;
    a shank extending through the sleeve and along a centerline;
    a first head engaged to the shank and disposed axially outward from the first end portion; and
    a second head engaged to the shank, axially spaced from the first head, and disposed axially outward from the second end portion, wherein the second head is a flange projecting radially outward from the second end portion, and the shank is threadably engaged to the sleeve.

12. The multi-shear fastener set forth in claim 11, wherein the sleeve is constructed and arranged to be located in a cell defined by the chassis frame that is tubular.

13. The multi-shear fastener set forth in claim 12, wherein the chassis frame includes a tubular side rail that defines the cell.

* * * * *